Nov. 22, 1966  M. R. BARROWS ETAL  3,286,523
LIQUID LEVEL GAUGE
Filed Jan. 30, 1964  2 Sheets-Sheet 2
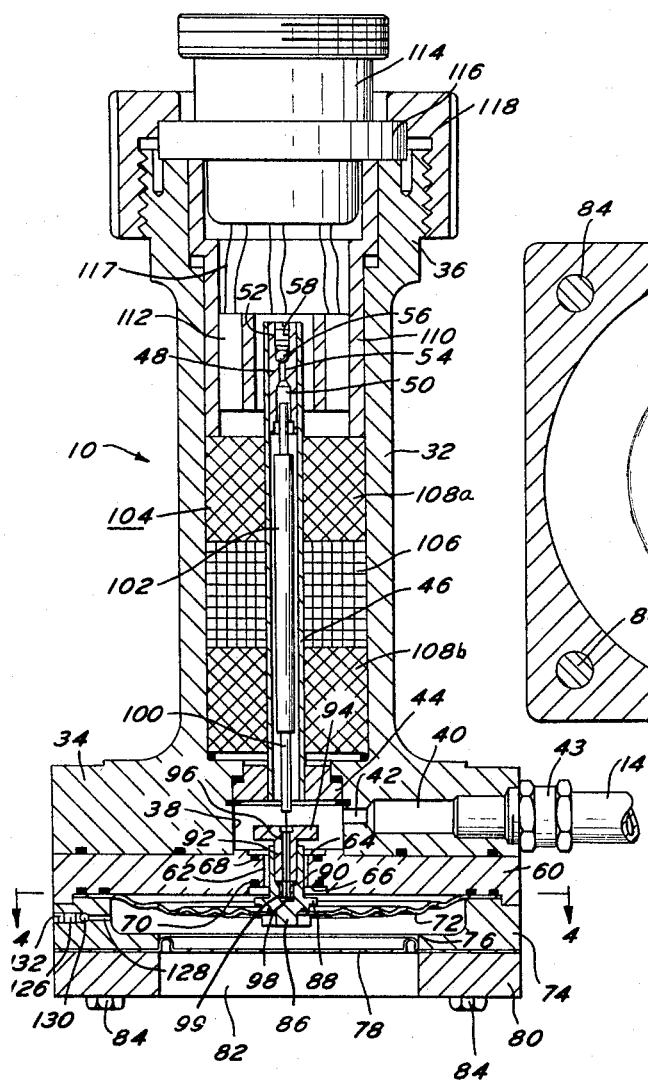
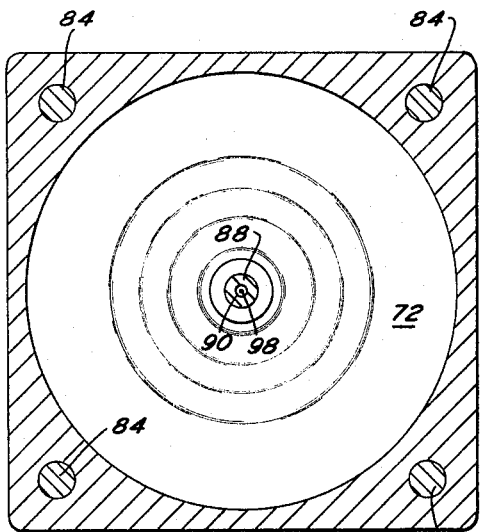
INVENTORS
WILLIAM B. PEGRAM
DONALD E. KAPLAN
BY MARTIN R. BARROWS
ATTORNEY

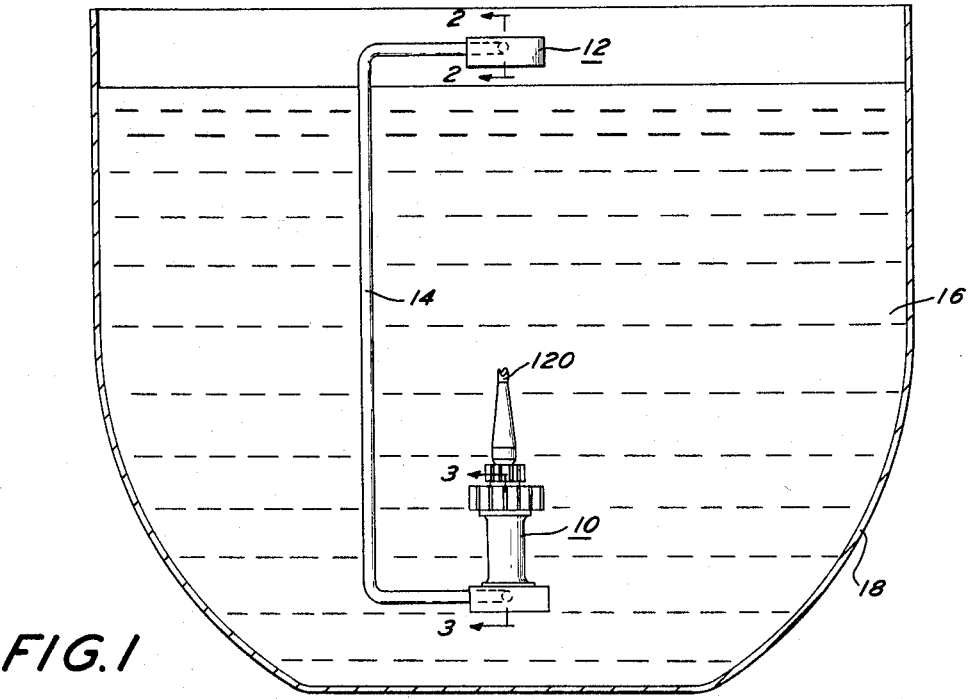
FIG.1
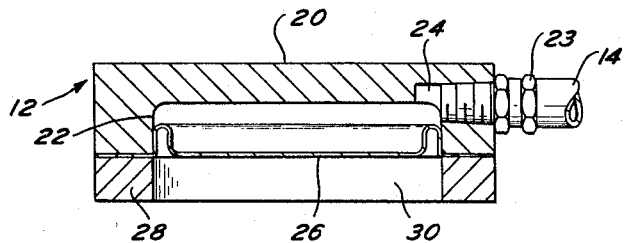

United States Patent Office 3,286,523
Patented Nov. 22, 1966

3,286,523
LIQUID LEVEL GAUGE
Martin R. Barrows, North Wales, Donald E. Kaplan, Philadelphia, and William B. Pegram, Swarthmore, Pa., assignors, by mesne assignments, to Robinson-Halpern Company, West Conshohocken, Pa., a corporation of Pennsylvania
Filed Jan. 30, 1964, Ser. No. 341,211
4 Claims. (Cl. 73—301)

The present invention relates to a liquid level gauge, and more particularly to a transducer system for measuring the level of a liquid in a tank.

There are many operations where it is necessary to measure the level of a liquid in a tank. Such measurement may be necessary either to control the level or weight of liquid in the tank, or to control or measure the amount of liquid being drawn from or added to the tank. There are a number of factors which must be taken into consideration in designing electrical or electro-mechanical equipment for measuring the level of a liquid in a tank. These factors include the shape of the tank, the contaminates which may be found in the liquid which could adversely affect the operation of the measuring equipment, possible changes in the conductivity of the liquid, the necessity of putting holes in the tank, possible variations of the pressure being applied to the liquid, and possible variations in the temperature of the liquid. Therefore, it is desirable to have a gauge for accurately measuring the level of a liquid in a tank with regard to which the effects of these factors are removed by design insensitivities or by specific compensation. Also, it is desirable that the measuring device be relatively simple in construction, and contain a minimum number of moving parts so as to have a long operable life.

It is an object of the present invention to provide a novel gauge for measuring the level of a liquid in a tank.

It is another object of the present invention to provide a novel transducer system for measuring the level of a liquid in a tank.

It is a further object to provide a transducer system for accurately measuring the level of a liquid in a tank even through the pressure applied to the liquid may vary, or the temperature of the liquid may vary.

It is a still further object of the present invention to provide a transducer system for measuring the level of a liquid in a tank, which is of relatively simple construction, and has only a few moving parts.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a view showing the gauge of the present invention mounted in a tank.

FIGURE 2 is a sectional view taken along line 2—2 of FIGURE 1.

FIGURE 3 is a sectional view taken along line 3—3 of FIGURE 1.

FIGURE 4 is a sectional view taken along line 4—4 of FIGURE 3.

FIGURE 5 is a diagram of the electrical circuit of the transducer of the present invention.

Referring initially to FIGURE 1, the gauge of the present invention comprises a sensor, generally designated as 10, a head, generally designated as 12, and a pipe 14 connecting the head 12 to the sensor 10. The sensor 10 is mounted within the liquid 16 adjacent the bottom of the tank 18. The head 12 is mounted within the tank 18 above the liquid 16.

Referring to FIGURE 2, head 12 comprises a casing 20 having a circular cavity 22 in one surface thereof. A port 24 extends through the casing 20 from an outer edge thereof to the cavity 22. A shut-off valve coupling 23 is secured in the port 24. One end of the pipe 14 has a mating coupling to be connected to the coupling 23. A slack diaphragm 26 extends across the cavity 22. A cover plate 28 extends across the slack diaphragm 26, and secures the diaphragm 26 to the casing 20. The cover plate 28 is secured to the casing 20 by suitable screws, not shown. Cover plate 28 has a circular opening 30 therethrough which is of a diameter corresponding to the diameter of the cavity 22 in the casing 20.

Referring to FIGURE 3, the sensor 10 comprises a tubular housing 32 having a plate 34 extending across the bottom end thereof, and an enlarged, externally threaded head 36 at its upper end. Plate 34 has a hole 38 extending therethrough from its bottom surface to the interior of the housing 32. The hole 38 is of a diameter smaller than the interior diameter of the housing. A port 40 is provided in a side edge of the plate 34, and a passage 42 extends from the end of the port 40 to the hole 38. A shut-off valve coupling 43 is secured in the port 40. The other end of pipe 14 has a mating coupling to be connected to the coupling 43.

An annular bushing 44 is sealingly secured within the upper end of the hole 38 in the plate 34 above the inner end of the passage 42. The bottom end of a sleeve 46 of a non-magnetic metal is secured within the bushing 44. The sleeve 46 extends upwardly through the housing 32. A plug 48 is secured in the upper end of the sleeve 46. Plug 48 is provided with a bearing hole 50 in its bottom end, and a threaded hole 52 in its top end. A passage 54 connects the threaded hole 52 and the bearing hole 50, and is smaller in diameter than both of the holes. A ball 56 is seated on the bottom of the threaded hole 52 across the top end of the passage 54. A set screw 58 is threaded into the threaded hole 52, and is adapted to seat the ball 56 tightly across the end of the passage 54.

A valve plate 60 extends across the bottom surface of the housing plate 34. Valve plate 60 is provided with a central hole 62 therethrough opening into the hole 38 in the housing plate 34. Valve seats 64 and 66 are provided in the top and bottom surfaces of the valve plate 60 around the hole 62. Circular sealing rings 68 and 70 are seated in grooves in the valve seats 64 and 66 respectively around the hole 62.

A corrugated metal diaphragm 72 extends across the bottom surface of the valve plate 60. A clamping plate 74 extends across the bottom surface of the valve plate 60, and clamps the outer edge of the diaphragm 72 to the valve plate. Clamping plate 74 has a large central opening 76 therethrough. A threaded hole 126 is provided in an edge of the clamping plate 74, and a passage 128 extends from the end of the hole 126 to the inner periphery of the clamping plate. Passage 128 is smaller in diameter than the diameter of hole 126. A ball 130 is seated on the bottom of hole 126 across the end of passage 128. A set screw 132 is threaded into the hole 126 to hold the ball 130 tightly seated on the bottom of hole 126. A slack diaphragm 78 of an impervious flexible material extends across the bottom surface of the clamping plate 74, and covers the opening 76 in the clamping plate. A second clamping plate 80 extends across the bottom surface of the slack diaphragm 78, and secures the slack diaphragm to the clamping plate 74. Clamping plate 80 has a large central opening 82 therethrough. Valve plate 60, clamping plate 74 and clamping plate 80 are secured together and to the housing plate 34 by bolts 84.

A valve stem 86 is secured at its bottom end to the center of the corrugated diaphragm 72, and extends upwardly through the hole 62 in valve plate 60. An annular valve head 88 extends radially outwardly from the valve stem 86 below the valve seat 66. A blind passage 90 extends longitudinally through the valve stem 86 from the top end thereof. A second valve stem 92 fits tightly within the blind passage 90 in the valve stem 86. An annular valve head 94 extends radially outwardly from the valve stem 92 above the valve seat 64. Valve stem 92 has a central passage 96 extending longitudinally therethrough.

A relatively stiff wire 98 extends through the passage 96 in the valve stem 92. The bottom end of the wire 98 is secured against the end surface of the passage 90 in the valve stem 86 by the valve stem 92 pressing on a bushing 99. An elongated rod 100 of a non-magnetic material is provided within the sleeve 46. The bottom end of the rod 100 is secured to the top end of the wire 98. The top end of the rod 100 is slidably supported in the bearing hole 50 in plug 48. An elongated transformer core 102 of a magnetic metal surrounds the rod 100 within the sleeve 46, and is secured to the rod 100. Core 102 is of a diameter only slightly smaller than the inner diameter of sleeve 46 so as to provide a narrow clearance therebetween.

A differential transformer, generally designated as 104, is provided within the housing 32 around the sleeve 46. Differential transformer 104 is of the type shown in the United States Letters Patent No. 2,507,344, issued May 9, 1950, to W. D. MacGeorge, entitled "Differential Transformer." The differential transformer 104 includes a central primary winding 106 and a pair of identical secondary windings 108a and 108b wound along opposite sides of the primary winding. As shown in Patent No. 2,507,344, the primary and secondary windings are wound around a bobbin of a non-magnetic material, and a cylindrical metal sleeve surrounds the windings and the bobbin to protect the windings from being damaged and to provide a magnetic shield for the windings.

A retainer sleeve 110 is provided within the housing 32 above the differential transformer 104. The retainer sleeve 110 engages the differential transformer 104 to firmly seat the differential transformer in the housing 32. An assembly 112 of electrical components associated with the circuit of the differential transformer 104 is seated in the retainer sleeve 110. The particular components within the assembly 112 and their relation to the differential transformer 104 will be described later. A water tight, pressure proof, multi-terminal socket 114 extends into the top end of the housing 32. Socket 114 has an annular flange 116 extending over the end of the housing 32. The flange 116 also extends across and engages the top end of the retainer sleeve 110 to secure the retainer sleeve within the housing 32. A cap 118 is threaded onto the head 36 of the housing 32, and engages the flange 116 of the socket 114 to secure the plug to the housing 32. Wires 117 connect the circuits formed by the components in the assembly 112 to the terminals of the socket 114. As shown in FIGURE 1, a cable 120 is connected to the socket 114 to connect the differential transformer 104 to instrumentation outside the tank 18 for reading the output of the differential transformer.

The chamber in the housing 32 formed by the sleeve 46, the hole 38 in the housing plate 34, the hole 62 in valve plate 60, and the diaphragm 72 is filled with a liquid, such as silicon oil. This is done through the coupling 43 before attaching the pipe 14 thereto. When the chamber in the housing 32 is filled with the liquid the set screw 58 and ball 56 are removed to permit the air in the chamber to escape. The chamber in the head 12 between the diaphragm 26 and casing 20 is filled with the same liquid through the coupling 23. The pipe 14 is likewise filled with the liquid. The chamber between the diaphragh 72 and the slack diaphragm 78 is also filled with a liquid through the hole 126 and passage 128.

In the use of the gauge of the present invention, the sensor 10 is mounted in the tank 18 adjacent the bottom of the tank with the slack diaphragm 78 facing the bottom of the tank (see FIGURE 1). The head 12 is mounted in the tank 18 above the highest level of the liquid 16 in the tank with the slack diaphragm 26 facing the liquid 16. Thus, the pressure of the air above the liquid 16 plus the pressure of the height of liquid 16 in the tank 18 is applied to the bottom of the metal diaphragm 72 of the sensor 10 through the slack diaphragm 78 and the liquid between the slack diaphragm 78 and the metal diaphragm 72. The pressure of the air above the liquid 16 is also applied to the slack diaphragm 26 of the head 12. The pressure applied to the slack diaphragm 26 of the head 12 is applied to the top surface of the metal diaphragm 72 of the sensor 10 through the liquid filling the head 12, pipe 14 and the chamber of the sensor 10 above the metal diaphragm 72. Although the liquid in the pipe 14 also applies a pressure on the top surface of the metal diaphragm, this pressure is compensated for in a manner which will be explained later. Thus, the pressure of the air in the tank 18 above the liquid 16 is applied to both sides of the metal diaphragm 72 and is balanced out. Therefore, the only pressure affecting the movement of the metal diaphragm 72 is that provided by the change in the weight of the liquid 16 in the tank 18.

The primary winding 106 of the differential transformer 104 is connected to a suitable source of A.C. current (not shown). The current in the primary winding 106 creates flux paths which induces voltages across the secondary windings 108a and 108b according to the number of turns of the secondary windings crossed by the transformer core 102. Thus, when the core 102 extends across the same number of turns of each of the secondary windings 108a and 108b, the voltages induced across the secondary windings are equal. If the core 102 extends across more turns of the secondary winding 108a than across the turns of secondary winding 108b, the voltage induced across secondary winding 108a is greater than the voltage induced across secondary winding 108b, and vice versa. The secondary windings 108a and 108b are connected in bucking relation to suitable instrumentation (not shown) for reading the voltage across the secondary windings. Since the secondary windings are connected in bucking relation to the read-out instrumentation, when the voltages induced across the secondary windings are equal, the read-out will be zero. When the voltage across one of the secondary windings is greater than that across the other secondary winding, the read-out will be the difference between the two voltages, and the polarity of the read-out will correspond to the polarity of the higher voltage.

In the assembly of the sensor 10, the transformer core 102 is mounted on the rod 100 at a postion so that the core 102 extends across an equal number of both secondary coils 108a and 108b when the liquid 16 in the tank 18 is at a desired level. Also, the core 102 is positioned on the rod 100 to compensate for the height of the liquid in the pipe 14 which applies a pressure to the top of the metal diaphragm 72. Thus, when the liquid 16 in the tank 18 is at this desired level, for example half full, the output of the transformer 104 is zero. If more liquid is added to the tank 18, the pressure applied to the bottom of the metal diaphragm 72 increases, causing the diaphragm 72 and the core 102 to move upwardly. This increases the voltage induced across the secondary winding 108a and decreases the voltage induced across the secondary winding 108b and provided an output from the transformer 104 equal to the difference between the voltages across the secondary windings and of a polarity corresponding to that of the secondary winding 108a. If liquid is then removed from the tank 18, the pressure applied to the bottom of the metal diaphragm 72 decreases so that the core 102 moves downwardly to decrease the output reading of the transformer. If the level of the liquid 16 falls below half full, the voltage induced across the secondary winding 108b becomes greater than that induced across the secondary winding 108a so that the output of the transformer will be of a polarity corresponding to that of secondary winding 108b. Thus, by properly calibrating the instrument for reading the output of the transformer 104, the output of the transformer will indicate the level of the liquid in the tank 18. This can be used to control either the amount of liquid in the tank 18 or the amount of liquid being added to or removed from the tank. Since the pressure of the air above the liquid in the tank 18 is applied to both sides of the diaphragm 72, changes in the pressure of the air do not affect the output of the transformer 104.

Variations in the temperature of the liquid 16 in the tank will cause a variation in the resistance of the primary winding 106 of the transformer 104 because of the temperature coefficient of resistance of the wire of the primary winding. This in turn varies the current through the primary winding 106. To maintain the current through the primary winding 106 constant with respect to changes in temperature, a temperature compensating circuit, generally designated as 122 in FIGURE 5, is provided in the circuit between the primary winding 106 and the source of A.C. current. Temperature compensating circuit 122 is a temperature sensitive resistance network the resistance of which varies with changes in temperature inversely of the variation of the resistance of the primary winding 106 with variations in temperature. Thus, if an increase in temperature causes the resistance of the primary winding to increase, the resistance of the temperature compensating circuit 122 will decrease a corresponding amount to maintain a uniform current through the primary winding. One type of such a temperature compensating circuit well known in the art is a network of thermisters and resistors such as described in the article entitled "Shaping the Characteristics of Temperature Sensitive Elements" by E. Keonjian and J. S. Schaffner, published in the October 1954 issue of Electrical Engineering.

Increases in the temperature of the liquid 16 in the tank 18 also increases the temperature of the liquid in the pipe 14 causing the liquid in the pipe to expand. Expansion of the liquid in the pipe 14 causes some of this liquid to flow into the head 12. This decreases the weight of the liquid in the pipe so that the pressure applied to the top surface of the diaphragm 72 decreases. A decrease in the pressure applied to the top of the diaphragm 72 moves the core 102 upwardly so as to increase the voltage induced across the secondary winding 108a and decrease the voltage induced across the secondary winding 108b. Thus, the output of the transformer is varied. To compensate for this, a temperature compensation circuit, generally designated as 124 in FIGURE 5, is provided in the circuit between the secondary winding 108a and the read-out instrument. Temperature compensating circuit 124 is a temperature sensitive resistance network the resistance of which increases upon an increase in temperature, an amount sufficient to compensate for the increase in the voltage induced in the secondary winding 108a and thereby maintain the difference between the voltage across the secondary windings constant for each level of the liquid 16 in the tank 18. Temperature compensating circuit 124 may be a network of thermisters and resistors such as described in the article cited above.

Thus, the differential transformer 104 is provided with the temperature compensating circuits 122 and 124 so that variations in the temperature of the liquid 16 in the tank 18 will not affect the output of the transformer. The electrical components forming the temperature compensating circuits 122 and 124 are in the assembly 112 mounted in the retainer sleeve 110 of the sensor 10.

In the operation of the sensor 10, movement of the metal diaphragm 72 is limited by the seating of the valve heads 88 and 94 against their respective valve seats 66 and 64. Thus, the diaphragm 72 cannot be damaged by any sudden extreme changes in the pressures applied to the sensor. The diaphragm 72 is also protected against damage caused by any chemical action of contaminants in the liquid 16 in the tank 18 by the slack diaphragm 78. The wire 98 connecting the rod 100 to the valve stem 86 is sufficiently stiff longitudinally to move the rod longitudinally upon movement of the diaphragm 72 but is flexible radially to maintain the position of the rod along the axis of the sleeve 46. Also, the wire 98 is connected to the valve stem 86 very close to the diaphragm 72. These minimize the friction between the rod 102 and the bearing 50 so that there is no undue drag on the movement of the rod which can affect the accuracy of the output of the transformer 104. As previously stated, there is a minimum clearance between the outer surface of the core 102 and the inner surface of the sleeve 46. This small clearance acts as an orifice through which the liquid in the sleeve 46 must flow upon movement of the core 102 to provide a dash-pot type action. This dash-pot action is sufficient to prevent undesirable movement of the core 102 which could be caused by such outside forces as shock, vibration, etc., applied to the sensor 10.

Thus, there is provided by the present invention a gauge for accurately measuring the level of a liquid in a tank. Knowing the density of the liquid and the shape of the tank, the output of the gauge can be calibrated to measure the weight of the liquid. The output of the gauge of the present invention is not affected by variations in the pressure of any air in the tank above the liquid, variations in the temperature of the liquid, or outside forces which may be applied to the gauge. The gauge is also protected from being damaged by sudden, extreme changes in the level or weight of the liquid in the tank and by any contaminants in the liquid. Having the sensor 10 of the gauge completely immersed in the liquid and positioned adjacent the bottom of the tank provides the gauge of the present invention with a number of advantages. One advantage is that the tank requires only one hole therethrough through which the cable 120 passes. This hole can be placed anywhere in the tank, and since the cable is solid, the hole can be easily sealed around the cable. Another advantage is that the sensor 10 is subjected only to the temperature of the liquid so that variations in temperature can be easily compensated for as previously described. In addition the gauge directly measures the height of the liquid in the tank and is independent of the shape of the tank. As previously described, the sensor 10, head 12 and pipe 14 can each be individually filled with the oil so as to permit prefilling prior to installation. Thus, the three parts can be shipped to the user disassembled, yet are easily assembled in the tank by merely attaching the pipe 14 to the sensor 10 and head 12.

Although the gauge of the present invention has been described as being used in a tank containing a liquid and a gas above the liquid, i.e., a liquid-gas system, the gauge can also be used in a tank filled with two immiscible liquids, i.e., a liquid-liquid system. In a liquid-liquid system, the sensor 10 is placed in the lower liquid and the head 12 in the upper liquid. The gauge can then be used to measure the level of either or both of the liquids.

The present invention may be embodied in other specific forms without departing from the spirit or essential attributes thereof and, accordingly, reference should be made to the appended claims, rather than to the foregoing specification as indicated in the scope of the invention.

We claim:

1. A gauge for measuring the level of a liquid in a tank comprising a sensor adapted to be mounted in the tank adjacent the bottom thereof, said sensor including a housing open at its bottom end, a resilient diaphragm extending across and secured to the open end of the housing, a differential transformer within said housing, a core of a magnetic material within the differential transformer to vary the output of the differential transformer, and means connecting the core to the resilient diaphragm so that movement of the diaphragm moves the core; a head adapted to be mounted above the highest level of the liquid in the tank, said head including a casing open at one end and a slack diaphragm extending across and secured to the open end of the head; and means connecting the interior of the head casing to the interior of the sensor housing so that the pressure applied to the slack diaphragm of the head is applied to the inner surface of the resilient diaphragm of the sensor; said sensor housing incuding a cylindrical tube having a plate extending across its bottom end, said plate having a central hole therethrough, said sensor further including an elongated sleeve of a non-magnetic material secured at its bottom end in the hole in the plate, and means closing the top end of said sleeve, said resilient diaphragm extending across and being secured to the bottom of said plate, said differential transformer being located within the tube and surrounding the sleeve, and said core being movable within the sleeve, said sensor further including a valve plate secured across the bottom surface of the sensor plate between the sensor plate and the resilient diaphragm, said valve plate having a central hole therethrough and a separate valve seat on each of its surfaces surrounding the hole, a valve stem secured to the resilient diaphragm and extending through the hole in the valve plate, and a separate valve head extending radially outwardly from the stem at each end thereof, each of said valve heads extending across a separate one of said valve seats and adapted to engage its respective valve seats upon movement of said resilient diaphragm to limit movement of the diaphragm.

2. A gauge for measuring the level of a liquid in a tank comprising a sensor adapted to be mounted in the tank adjacent the bottom thereof, said sensor including a housing open at its bottom end, a resilient diaphragm extending across and secured to the open end of the housing, a differential transformer within said housing, a core of a magnetic material movable within the differential transformer to vary the output of the differential transformer, and means connecting the core to the resilient diaphragm so that movement of the diaphragm moves the core; a head adapted to be mounted above the highest level of the liquid in the tank, said head including a casing open at one end and a slack diaphragm extending across and secured to the open end of the head; and means connecting the interior of the head casing to the interior of the sensor housing so that the pressure applied to the slack diaphragm of the head is applied to the inner surface of the resilient diaphragm of the sensor; said sensor housing including a cylindrical tube having a plate extending across its bottom end, said pate having a central hole therethrough, said sensor further including an elongated sleeve of a nonmagnetic material secured at its bottom end in the hole in the plate, and means closing the top end of said sleeve, said resilient diaphragm extending across and being secured to the bottom of said plate, said differential transformer being located within the tube and surrounding the sleeve, and said core being movable within the sleeve, said means connecting said core to said resilient diaphragm including a rod of nonmagnetic material slidably supported for longitudinal movement along the longitudinal axis of the sleeve of the sensor said transformer core being mounted on said rod; and a connection between said rod and resilient diaphragm that is flexible laterally and stiff longitudinally said flexible connection including a relatively stiff wire secured at one end to the rod and at the other end to the resilient diaphragm.

3. Pressure gauge apparatus for measuring the difference between input pressures whose individual magnitudes exceed the pressure difference, said apparatus comprising a sensor including an electrical differential pressure transducer having a single resilient pressure-responsive device and a plurality of pressure input connections in communication with said resilient device; means for applying one of said pressures to one of said input connections; and means providing a closed liquid-fill pressure-transmitting system between a source of another of said pressures remote from said sensor and said resilient device, said closed pressure-transmitting means including a pressure-sensing head having a casing with first and second openings therein, a chamber for liquid-fill, and a slack diaphragm secured to said casing and extending across and enclosing said first opening and chamber, and an elongated conduit for pressure-transmitting liquid-fill connected between said second head opening and another of said transducer input connections so that liquid-fill in the volume between said slack diaphragm and the resilient pressure-responsive device of said transducer accurately transmits the pressure applied to said slack diaphragm to said resilient device in a direction to oppose said one pressure, said means providing a closed, liquid-fill pressure-transmitting system further including shut-off valve couplings at said second head-opening. said other transducer connection, and at the connecting ends of said conduit so that the apparatus is readily assembled and disassembled when said pressure-transmitting system is filled with liquid.

4. Pressure gauge apparatus for measuring the difference between input pressures whose individual magnitudes exceed the pressure difference, said apparatus comprising a sensor including an electrical differential pressure transducer having a single resilient pressure-responsive device and a plurality of pressure input connections in communication with said resilient device; means for applying one of said pressures to one of said input connections; and means providing a closed, liquid-fill pressure-transmitting system between a source of another of said pressures remote from said sensor and said resilient device, said closed pressure-transmitting means including a pressure-sensing head having a casing with first and second openings therein, a chamber for liquid-fill, and a slack diaphragm secured to said casing and extending across and enclosing said first opening and chamber, and an elongated conduit for pressure-transmitting liquid-fill connected between said second head opening and another of said transducer input connections so that liquid-fill in the volume between said slack diaphragm and the resilient pressure-responsive device of said transducer accurately transmits the pressure applied to said slack diaphragm to said resilient device in a direction to oppose said one pressure, said electrical transducer including a circuit for producing electrical signals that vary in accordance wtih said pressure differences, said circuit including means responsive to variations in ambient temperature for producing a variable impedance to said signals to compensate for variations of the density of liquid-fill in said conduit with said temperature.

References Cited by the Examiner

UNITED STATES PATENTS

| 872,183 | 11/1907 | Jenning | 33—209 |
| 2,692,501 | 10/1954 | Erwood | 73—299 X |
| 2,700,306 | 1/1955 | Johnson | 73—301 |
| 2,752,949 | 7/1956 | Jones | 73—406 X |
| 3,038,336 | 6/1962 | Peters | 73—299 |
| 3,044,029 | 7/1962 | Pegram | 92—1 X |
| 3,092,916 | 6/1963 | Kendziorek et al. | 73—301 X |

FOREIGN PATENTS

| 676,634 | 11/1929 | France. |
| 4,888 | 1886 | Great Britain. |
| 638,057 | 5/1950 | Great Britain. |
| 773,677 | 1/1957 | Great Britain. |

LOUIS R. PRINCE, *Primary Examiner.*

ISAAC LISANN, *Examiner.*

FRANK H. THOMSON, S. CLEMENT SWISHER,
*Assistant Examiners.*